Figure 7:
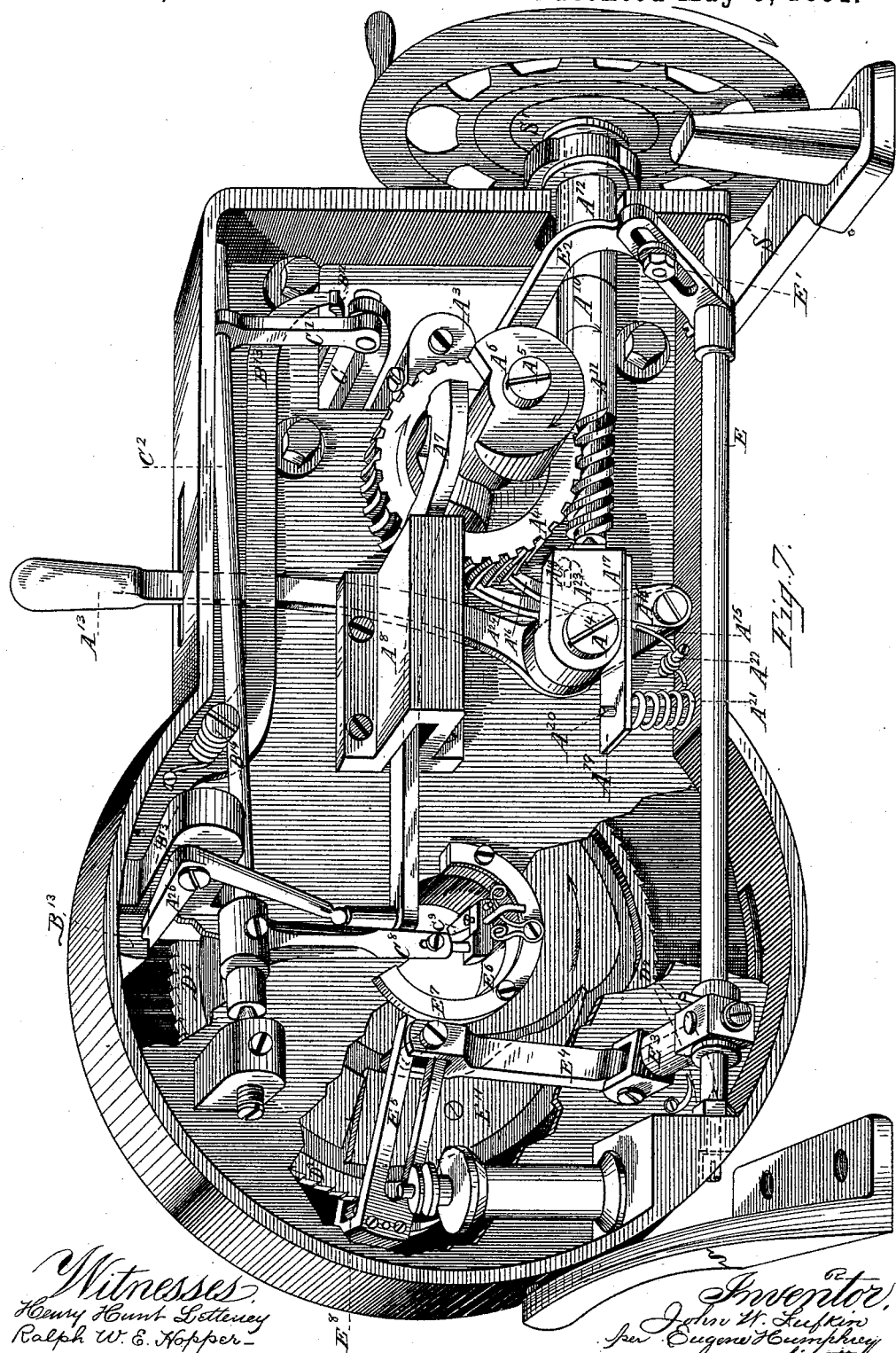

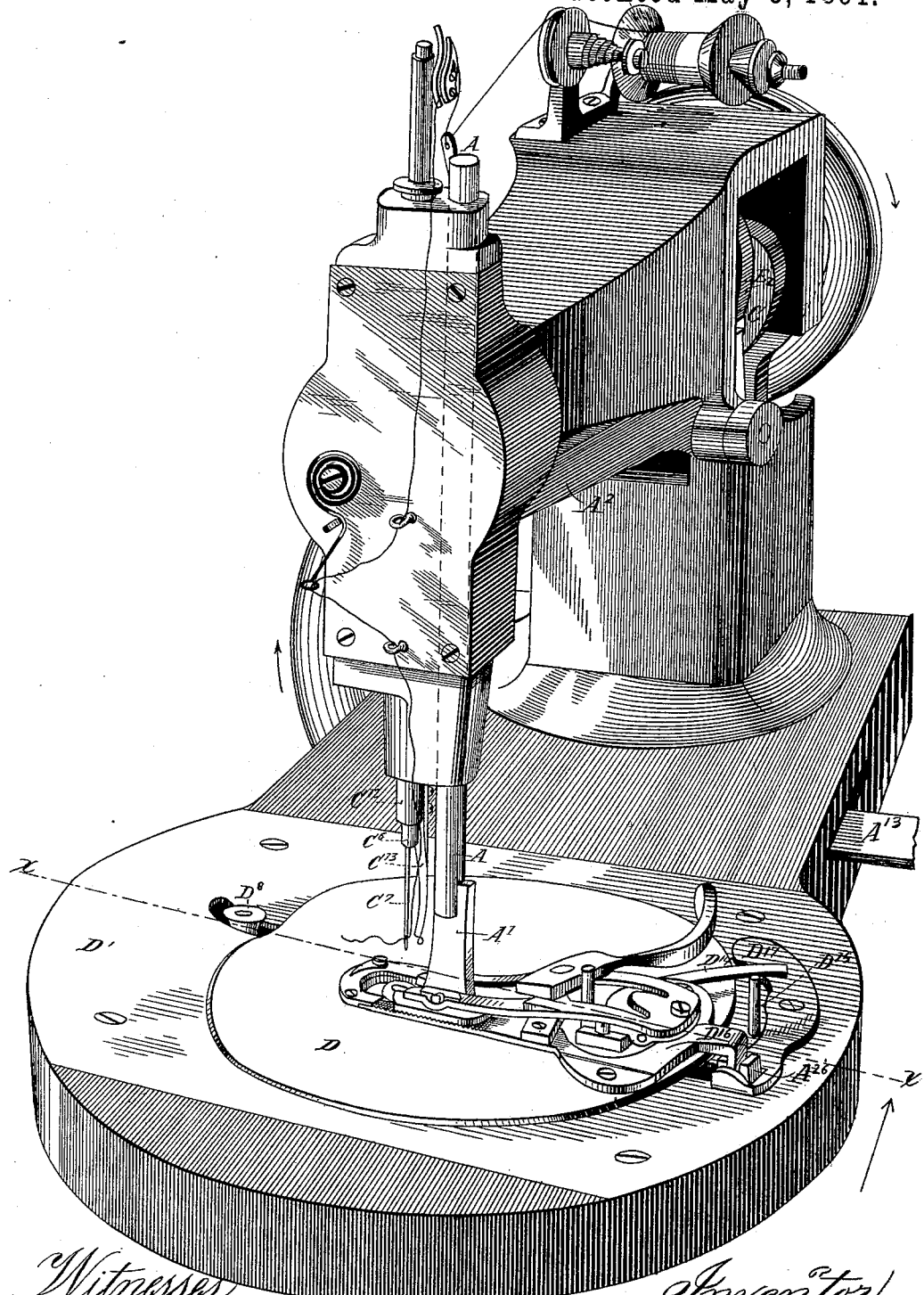

(No Model.) 8 Sheets—Sheet 2.
J. W. LUFKIN.
BUTTON HOLE STITCHING MACHINE.
No. 451,498. Patented May 5, 1891.
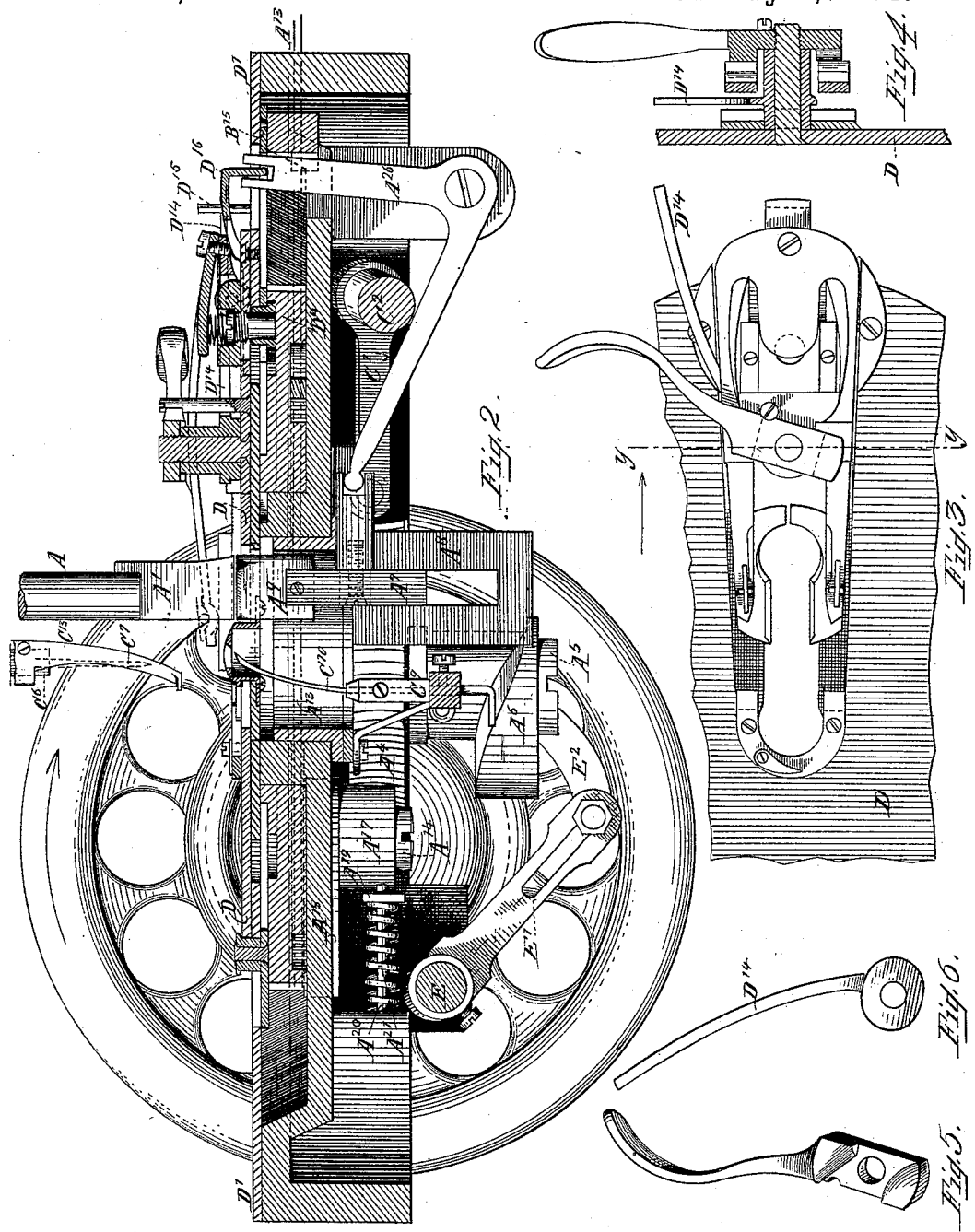

(No Model.) 8 Sheets—Sheet 3.
J. W. LUFKIN.
BUTTON HOLE STITCHING MACHINE.

No. 451,498. Patented May 5, 1891.

Witnesses:
Henry Hunt Letteney
Ralph W. E. Hopper

Inventor:
John W. Lufkin
per Eugene Humphrey
his atty.

(No Model.) 8 Sheets—Sheet 4.
J. W. LUFKIN.
BUTTON HOLE STITCHING MACHINE.
No. 451,498. Patented May 5, 1891.
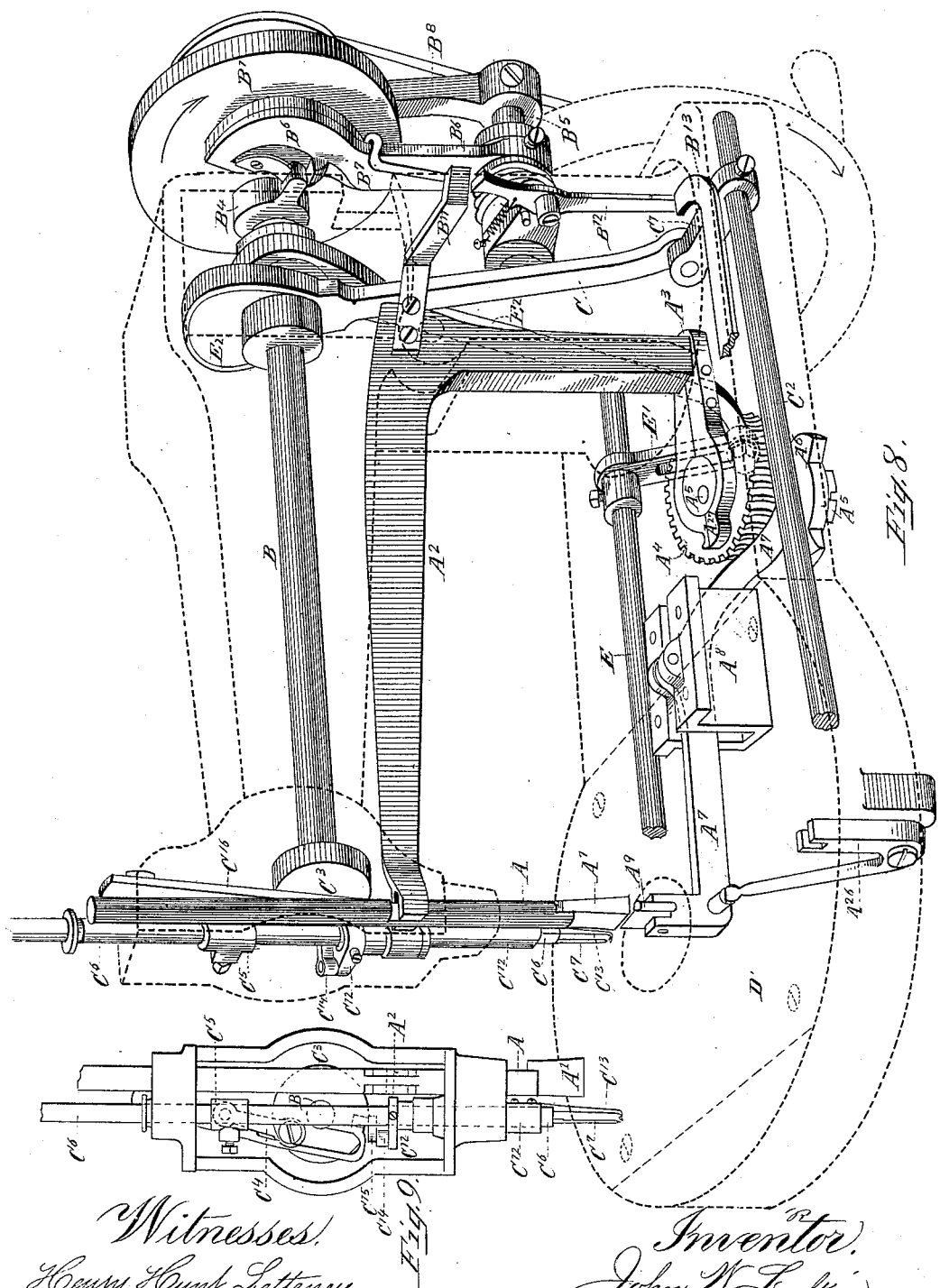
Witnesses:
Henry Hunt Letteney
Ralph W. E. Hopper.
Inventor:
John W. Lufkin
per Eugene Humphrey
his Atty (No Model.) 8 Sheets—Sheet 5.
J. W. LUFKIN.
BUTTON HOLE STITCHING MACHINE.
No. 451,498. Patented May 5, 1891.
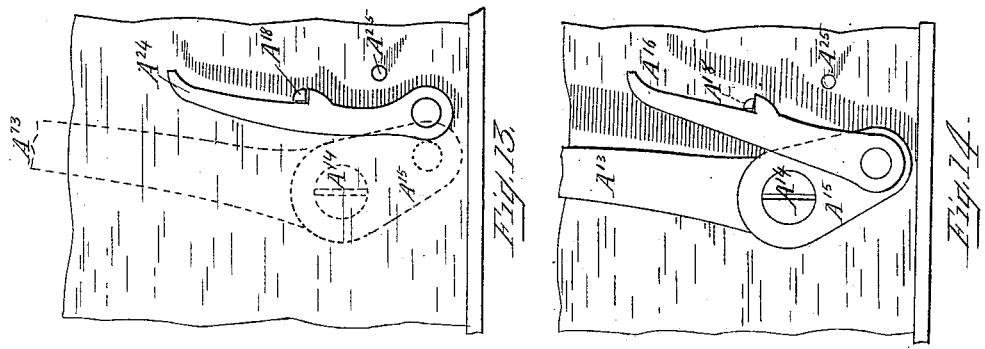
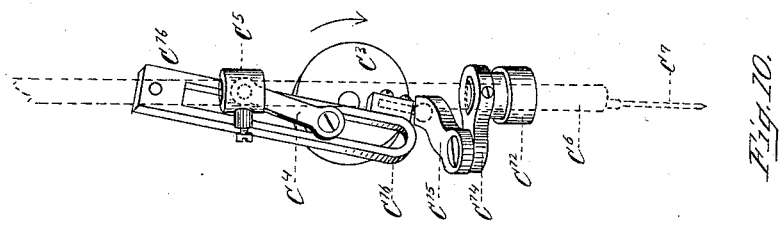
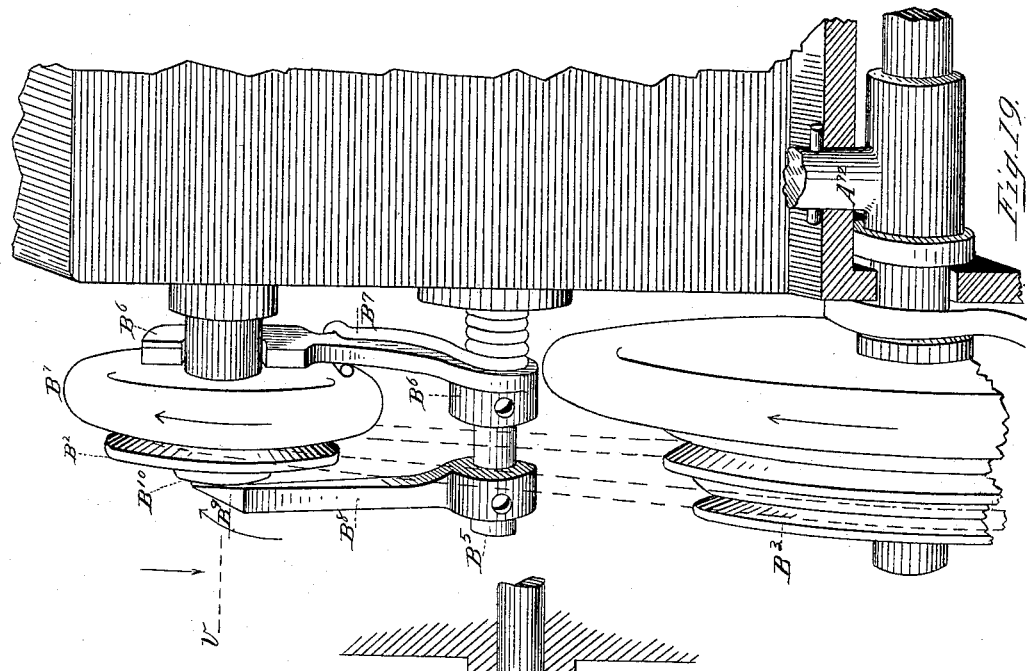
Witnesses
Henry Hunt Letteney
Ralph W. E. Hopper
Inventor
John W. Lufkin
per Eugene Humphrey
his atty.

(No Model.) 8 Sheets—Sheet 6.
J. W. LUFKIN.
BUTTON HOLE STITCHING MACHINE.
No. 451,498. Patented May 5, 1891.
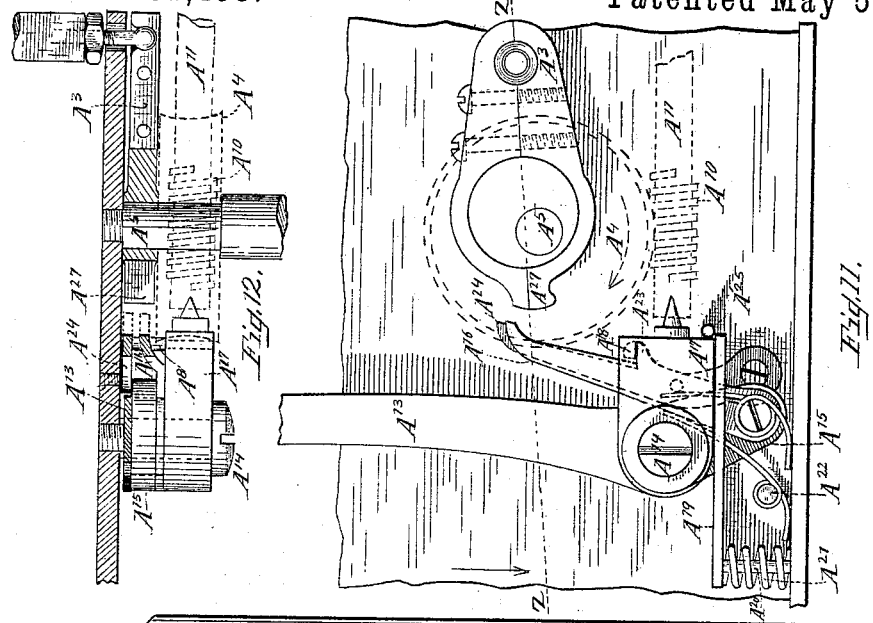
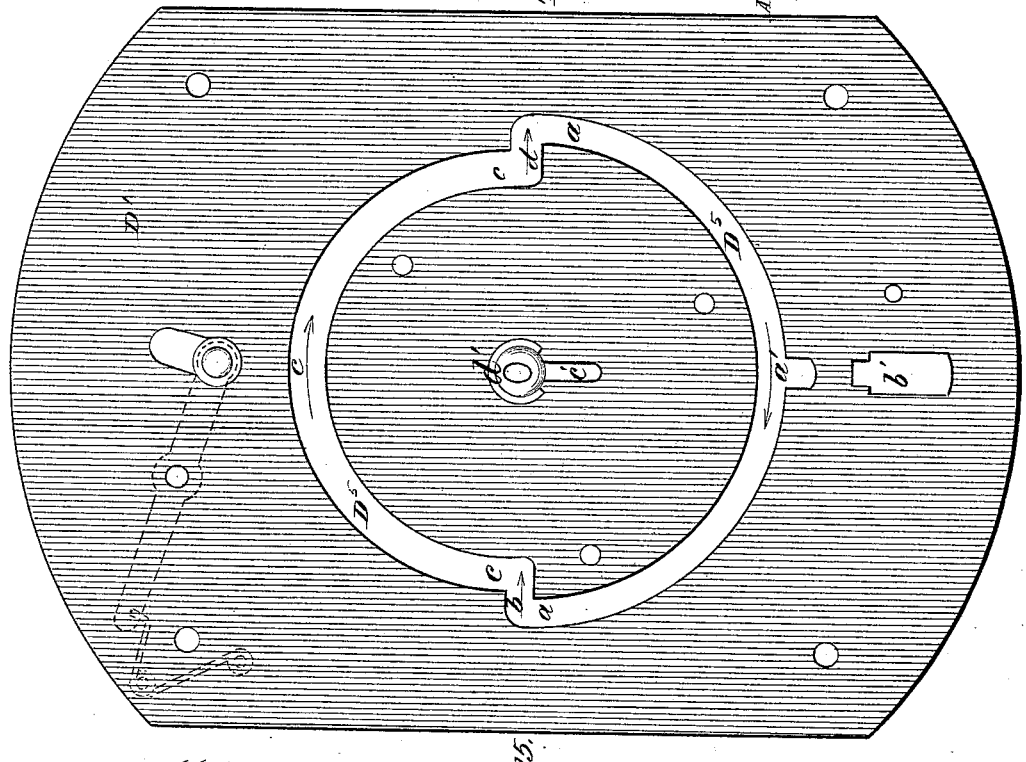
Witnesses:
Henry Hunt Letteney
Ralph W. E. Hopper.
Inventor
John W. Lufkin
per Eugene Humphrey
his atty (No Model.)  8 Sheets—Sheet 7.
J. W. LUFKIN.
BUTTON HOLE STITCHING MACHINE.
No. 451,498.  Patented May 5, 1891.
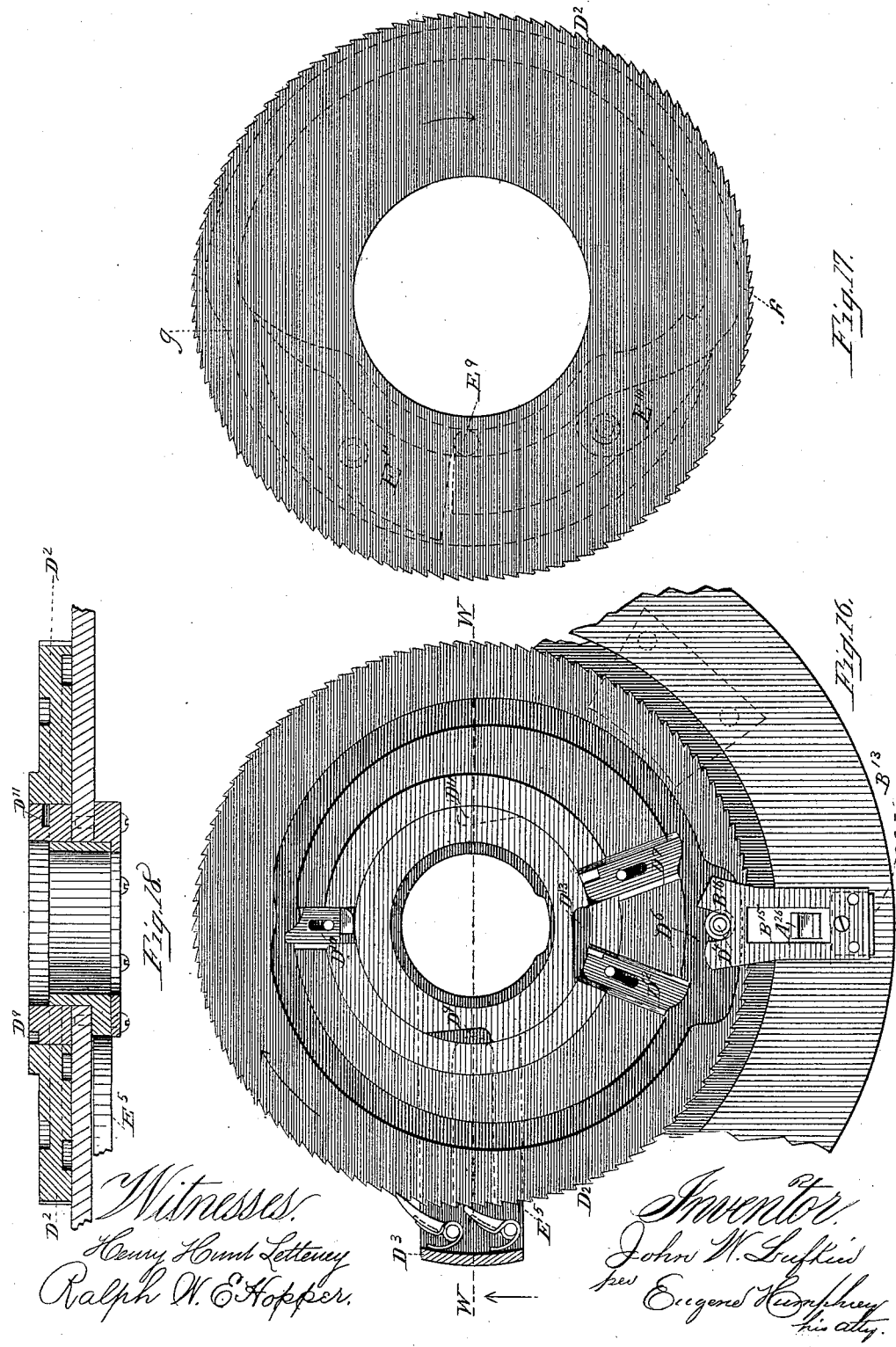

(No Model.) 8 Sheets—Sheet 8.
J. W. LUFKIN.
BUTTON HOLE STITCHING MACHINE.
No. 451,498. Patented May 5, 1891.
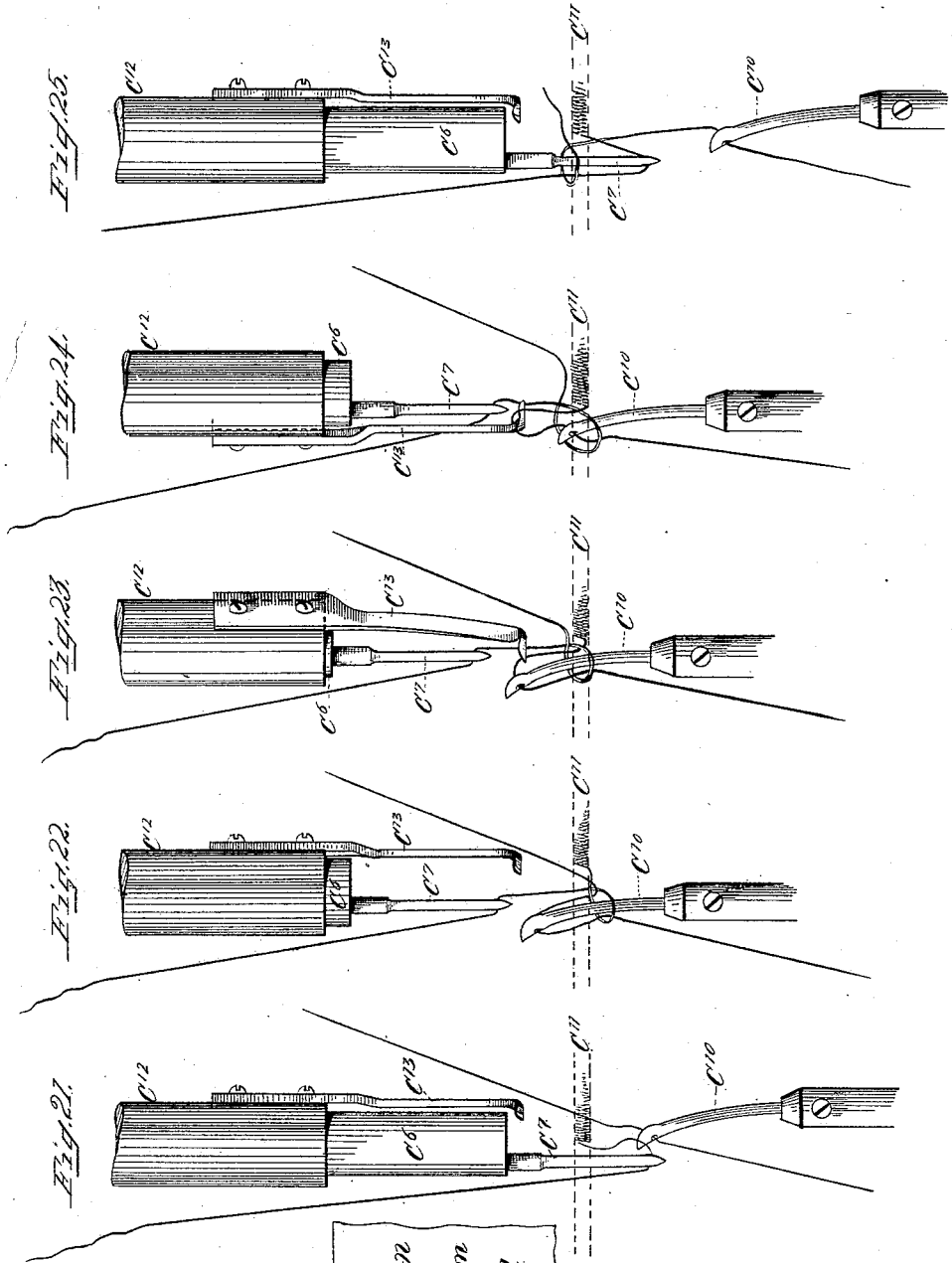
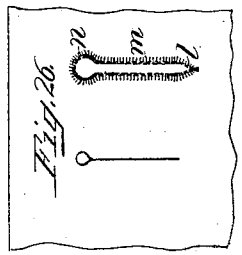
Witnesses.
Henry Hunt Letteney
Ralph W. E. Hopper.
Inventor.
John W. Lufkin
per Eugene Humphrey
his Atty.

UNITED STATES PATENT OFFICE.

JOHN W. LUFKIN, OF WINCHESTER, MASSACHUSETTS.

BUTTON-HOLE-STITCHING MACHINE.

SPECIFICATION forming part of Letters Patent No. 451,498, dated May 5, 1891.

Application filed April 28, 1890. Serial No. 349,809. (No model.)

*To all whom it may concern:*

Be it known that I, JOHN W. LUFKIN, of Winchester, in the county of Middlesex and State of Massachusetts, have invented a new and useful Improvement in Button-Hole-Stitching Machines, which will, in connection with the accompanying drawings, be hereinafter fully described, and specifically defined in the appended claims.

My invention relates to that class of button-hole-stitching machines which automatically cuts the button-holes, overseams the edges thereof, has a traveling cloth-clamp which properly feeds and presents the edge of the button-hole slit to the action of the overstitching mechanism, and automatically stops when the finishing of a button-hole is thereby completed; and the invention consists in the novel devices employed to effect said several operations in the making of button-holes by machinery, which will, in connection with the accompanying drawings, be hereinafter fully described, and specifically pointed out in the appended claims.

In the accompanying drawings, Figure 1 represents in perspective a button-hole-sewing machine embodying my invention, the parts contained in the view being in the positions they occupy when the first operation—the cutting of the button-hole—is being performed. Fig. 2 is a vertical transverse section, enlarged, taken as on line $x\,x$, Fig. 1, the parts being in the same position and viewed from the front of said section-line. Fig. 3 is a top plan view of the clamp shown in Fig. 1. Fig. 4 is a vertical transverse section of the same, taken as on line $y\,y$, Fig. 3, and as viewed from the left of said line. Fig. 5 is an under side view in perspective of the lever employed to force the upper and under jaws of the clamp together. Fig. 6 is a like view of the lever and its cam employed to force said jaws apart or spread them laterally. Fig. 7 is an under side view of the machine in perspective, the parts shown being in their respective positions, as when the button-hole is being cut, and a portion of the bed of the machine is shown as broken away to disclose parts of the feeding mechanism which would otherwise be hidden. Fig. 8 represents in perspective the outline only of the bed and arm of the machine in dotted lines, while the principal interior parts constituting the cutting, stitching, and stopping devices, and contained partly in the upper portion of the machine and partly below the bed, are clearly shown in their proper relations to each other. Fig. 9 is a front end elevation of the head of the machine with the face-plate removed disclosing the devices through which the upper needle and looper are operated. Fig. 10 is a view in perspective of the same as detached from the frame of the head. Fig. 11 is a detached under side plan view of the lever-and-pawl mechanism through which the cutting mechanism is set in motion and automatically stopped independently of the stitching mechanism. Fig. 12 is a vertical longitudinal section taken as on line $z\,z$, Fig. 11, and as viewed from above said line. Fig. 13 is a view of the inner and fixed supporting-pawl of the worm-shaft detached. Fig. 14 is a view of the outer and movable lifting-pawl of the worm-shaft detached. Fig. 15 is a top view of the work-plate and the attachments upon which the traveling cloth-clamp is moved or fed and by which it is guided. Fig. 16 is a top view or plan of the grooved feed-wheel and its attachments which occupy a recess in the bed of the machine beneath the work-plate. Fig. 17 is a like view of the feed-wheel, omitting the grooves and attachments on its upper side, and showing in dotted lines the grooves and attachments on its under side. Fig. 18 is a vertical section taken as on line $w\,w$, Fig. 16, and viewed from the front of said line. Fig. 19 is a rear view in perspective of portions of the automatic stopping and starting mechanism, and showing the swivel-bearing in which the worm-shaft of the cutting mechanism is supported. Fig. 20 is a horizontal section through the projecting end of the upper shaft and its driving-pulley, taken as on line $v$ in Fig. 19, and as seen from above said line. Figs. 21, 22, 23, 24, and 25 represent the different relative positions of the needles, looper, and loops of thread in the various successive stages in the formation of the overedge-stitch. Fig. 26 is a diagram showing the peculiar form of button-hole produced by the stitching and feeding mechanism and the strong fastening of the inner end of the button-hole by the intersection and crossing of the converging curved lines of stitching at that point.

As the drawings represent many features which are common to machines of this class, I will refer to such features in detail only when it becomes necessary to make clear my description of the novelties contained therein.

The cutting operation being the first in the order of practical operations of the machine, I will first describe the devices connected therewith and their mode of operation, referring to Figs. 1, 2, 7, 8, 9, 11, 12, 13, and 14. A vertical bar $A$ is arranged to move up and down in bearings in the head of the machine and carries at its lower end a brass or composition cutter-block $A'$. This bar $A$ is moved up and down by means of the horizontal arm of a strong lever $A^2$, pivoted in the overhanging arm of the machine, as shown. A vertical arm of this lever extends from its pivoted point downward through an opening in the bed of the machine, and there connects by means of a ball-and-socket joint (see Fig. 12) with an arm $A^3$, mounted upon the eccentric hub of a worm-gear $A^4$, which gear turns upon a fixed vertical stud $A^5$. There is also upon the opposite and lower side of said gear a cam $A^6$, (see Fig. 7,) which turns therewith upon the stud, and into the groove of which one end of a cutter-lever $A^7$ operates. This lever is pivoted in a bracket $A^8$, secured to the under side of the machine-bed, as shown, and extends forward from its fulcrum to a position in the vertical plane of the bar $A$, where it turns upward and carries in its upturned end a cutter $A^9$, as clearly shown in Fig. 8. When the cutting mechanism is operated, the block $A'$ and cutter $A^9$ are caused to approach each other and come into contact through the central opening in the bed of the machine and work-plate, as shown in Fig. 2. A shaft $A^{10}$, having a driving-wheel upon its outer end and a worm $A^{11}$ on its inner end, is supported in a swivel-bearing $A^{12}$, (see Fig. 19,) which affords the worm sufficient lateral movement to enable it to be thrown into and out of working contact with gear $A^4$. To bring this worm into operative connection with its gear, a lever $A^{13}$ is employed, which extends outward through a slot in the front side of the machine, as shown in Fig. 7, at which end it is conveniently manipulated by the operator. This lever is pivoted to the bed of the machine by means of a screw-stud $A^{14}$, and has a short arm $A^{15}$, to which is pivoted a pawl $A^{16}$. A rocking block $A^{17}$, having a taper point which centers in the end of the worm-shaft, as shown in Figs. 7, 11, and 12, is also pivoted upon stud $A^{14}$. This block carries a pin $A^{18}$, which projects upward from the block, and also a horizontal bar $A^{19}$, in which a pin $A^{20}$ is secured, which extends laterally to the edge of the machine-bed. This last-named pin supports a spiral spring $A^{21}$, which is compressed between bar $A^{19}$ and the downward-projecting edge of the machine-bed. Another pin $A^{22}$, secured in the bed of the machine at right angles to pin $A^{20}$, supports a wire spring coiled around it, one end of which presses against the lever-pawl $A^{16}$ and forces its free end toward the worm-gear. This pawl is formed with a shoulder $A^{23}$, which engages pin $A^{18}$ in block $A^{17}$ when the lever $A^{13}$ is manipulated to cause the worm to engage the worm-gear. A pawl $A^{24}$, similar in construction to the last-named pawl, is pivoted in a fixed position to the bed of the machine and has its free end forced toward the worm-gear by a similar spring, and both pawls when at rest bear upon pin 18, and a pin $A^{25}$ projects downward from the machine-bed, against which rests at the same time the end of the block $A^{19}$, which supports the inner end of the worm-shaft $A^{10}$. An angle-lever $A^{26}$ (clearly shown in Fig. 7) is pivoted to a bracket on the under side of the machine, one arm of said lever being connected by a a ball-and-socket joint with the forward end of lever $A^7$, while the other arm projects upward through a slot in the machine-bed and work-plate where it receives into its slotted end an overhanging portion of the cloth-clamp, as clearly shown in Fig. 2. It is necessary to draw the clamp back away from the stitching devices in order to bring the material to be cut into proper position between the cutter-block and cutter, and a recess in the feed-wheel and a slot in the bed and work-plate permit the clamp to be so drawn out of the groove and the feed-wheel and to be replaced therein automatically, and the function of this lever $A^{26}$ is to draw the clamp back into the position shown during the time the cutter and block are approaching each other, and, after their cutting contact in such position, to move the clamp forward again while the cutter and block are traveling away from each other and carry the button-hole thus cut into the proper relation to the stitching mechanism, which will be hereinafter described. At the commencement of this automatic cutting operation the worm $A^{11}$ is out of contact with the gear $A^4$ and the worm-shaft $A^{10}$ is revolving idly, and the other parts of the machine are at the same time rendered inoperative by means which will be described. The goods in which the button-hole is to be cut having been placed properly in the clamp, the operator next takes hold of the handle of lever $A^{13}$ and moves it to the left into the position shown in Fig. 7. This movement rocks the lever on its fulcrum $A^{14}$, and thereby forces the pawl $A^{16}$, attached to its short arm, into contact with pin $A^{18}$ in block $A^{17}$, and causes the block to move with it together with the worm $A^{11}$, with which it is engaged through its tapered point centered in the end of the worm-shaft, and thus carries the worm into working contact with gear $A^4$. The worm is thus connected with the gear against the resistance of spring $A^{21}$, and to prevent the reaction of the spring throwing it out of gear when the operator releases the lever A¹³ the second pawl A²⁴ is employed. When the block is moved as just described, its pin A¹⁸ is thereby carried into position to be locked by the shoulder on pawl A²⁴, which pawl, being pivoted to the bed of the machine, effectively resists the reaction of spring A²¹, after the lever A¹³ and its movable pawl A¹⁶ are released by the operator. The engagement of the worm and gear thus brought together sets the gear in motion together with its cam A⁶ and eccentric arm A³. The eccentric arm rocks the lever A² on its pivot and thereby causes it to force downward the bar A, with its block A', and at the same time cam A⁶ is rocking lever A⁷ on its fulcrum, and thereby causing the cutter A⁹ to move up toward block A'. Thus the cutter and block are brought together with the requisite force to cut the button-hole in the material held in the clamp, and while the cutter and block are thus being made to approach each other the clamp is drawn back upon the work-plate into the proper position by means of the lever A²⁶, actuated by lever A⁷, as the latter moves its cutter upward, all the parts being adjusted to perform their respective functions in proper time relatively to each other. The operations just described and the return of the parts to their respective starting-points are completed by one revolution of the worm-gear A⁴, and as this single revolution is being completed a projection A²⁷ on the back of the eccentric arm A³ comes in contact with the pawls A¹⁶ and A²⁴ and forces them back as it wipes against and by them, thereby releasing the block-pin A¹⁸ from their notches or shoulder and allowing the reaction of spring A²¹ to rock the block on its stud and thus throw the worm out of gear, when the movements of the cutting mechanism instantly cease. When the movements of the cutting devices thus cease, the stitching mechanism is instantly set in motion by automatic devices, which I will now describe.

Upon the rear end of the upper shaft B, which extends through the overhanging arm of the machine, there is secured a wheel B', as shown in Figs. 8, 19, and 20. This wheel B' is recessed upon one side, as shown in Fig. 20, and into said recess a friction-pulley B², which is loosely mounted upon the end of the shaft, plays in a well-known manner, and when forced into the recess drives wheel B' by frictional contact therewith, the pulley B² being driven by means of a belt connected with a driving-pulley B³ on the lower shaft, as shown in Fig. 19. There is also secured to shaft B, adjacent to the inner side of wheel B', a clutch B⁴. (Shown clearly in Fig. 8.) Below the upper shaft a short shaft B⁵ extends outward from the arm of the machine, and is arranged to rock in its bearing upon said arm. To this short shaft is secured a locking arm or lever B⁶, which extends upward and is formed and arranged to interlock with clutch B⁴, as shown in Figs. 8 and 19, when forced into contact with the clutch by spring B⁷. Near the outer end of the shaft B⁵ is secured thereon another upward-extending arm B⁸, which is wedge-shaped at its upper end, as shown in Figs. 19 and 20, this wedge B⁹ being arranged to act against a rounded projection B¹⁰ on pulley B². The arms B⁶ and B⁸ rock simultaneously with shaft B⁵, and are so arranged thereon relatively to each other that when arm B⁶ is interlocked with clutch B⁴, arm B⁸ at its thinner edge will be but slightly in contact with the friction-pulley. Consequently said pulley will revolve loosely upon its shaft while the latter is thus firmly locked against rotation; but when shaft B⁵ is rocked by means to be described so as to release clutch B⁴ from lever B⁶, then by the same movement which so releases the clutch arm B⁸ will be forced into contact with projection B¹⁰, and thereby pulley B² will be pressed into frictional contact with the walls of the recess in wheel B' and cause the wheel to revolve, thus communicating motion to shaft B and all parts actuated thereby. During the operation of the cutting mechanism which has been described the upper shaft is locked, as stated; but as the lever A², which operates the cutter-block, returns to its idle position an angular arm B¹¹, projecting therefrom, as shown in Fig. 8, presses down upon the top of a lever B¹², which is pivoted to a short arm secured to shaft B⁵, and thereby rocks said shaft so as to disengage lever B⁶ from clutch B⁴, thereby releasing the upper shaft, which actuates the stitching mechanism, and at the same time forces the friction-pulley B² into contact with wheel B' through the arm or lever B⁸, thus starting the stitching and feeding devices into activity immediately upon the completion of the cutting operation and the returning of the clamp with its button-hole thus cut into its proper position on the work-plate to be acted upon by the feeding and stitching mechanism. As soon as the button-hole is completely stitched around, as will be hereinafter described, the stitching mechanism is again automatically and instantaneously locked, as follows: A lever B¹³ (shown in Fig. 7) is pivoted to the under side of the machine at B¹⁴. The rear end of this lever is curved and rests against the lower end of lever B¹², which projects down through an opening in the machine-bed, as shown in Figs. 7 and 8. The forward end of lever B¹³ is also curved, and is attached to a block which projects therefrom up through the bed, and to which a slide B¹⁵ under the work-plate, as shown in Fig. 16, is secured. As the clamp is turned around in completing the stitching of the button-hole, its pin, by which it is guided and actuated just before it reaches the position in the notch in said slide in which it is shown in Fig. 16, strikes the inner edge B¹⁶ of said slide and forces the slide suddenly backward, thereby rocking lever B¹³ and through it also rocking lever B¹², so as to withdraw and release the upper end of the latter lever from the downward pressure of arm B¹¹, thus releasing the rock-shaft $B^5$ and its attachments, when, by the instantaneous action of spring $B^7$, the clutch devices are interlocked again, and the rotation of shaft B and the movement of all parts actuated thereby is suddenly arrested and firmly held inoperative, and at the same time that the clamp-pin engages the edge $B^{16}$ of the slide, and thereby, as described, renders the clutch mechanism operative to stop the feed and stitching devices, the overhanging arm $D^{16}$ of the clamp moves into the transversely-slotted end of lever $A^{26}$, which projects up through a slot in the work-plate, and to prevent the momentum of the clamp from carrying this arm through the open slot and beyond the lever a pivoted latch $D^{17}$ is employed, which is moved by the base of the clamp into the position shown in Fig. 1 and closes one side of the slot in advance of the arrival of the clamp-arm therein; and after the clamp is drawn back, as shown, carrying the end of the stop-latch $D^{17}$ in contact with lever $A^{26}$ back with it, at its next forward movement it leaves the lever $D^{17}$ behind in the position shown, where it remains until the clamp-base comes around again into contact with its opposite end, when it is again forced forward and closes the slot in lever $A^{26}$, as before, thus stopping the clamp-arm $D^{16}$ from passing through the slot. The clamp being drawn back again into the position shown, the machine is now in order to commence another cutting operation by throwing the worm $A^{11}$ into gear, as has been described, when the button-hole will be automatically cut and stitched and the machine stopped again, as before described.

I will now describe the devices employed by me for stitching the button-hole.

The rotary shaft B, as shown in Figs. 7 and 8, operates an eccentric arm C, which extends downward through the bed of the machine and connects with a short arm C', secured to a rock-shaft $C^2$. Upon the front end of shaft B is a disk $C^3$, to which is eccentrically pivoted one end of a link $C^4$, while the other end of the link is pivotally attached to an adjustable sleeve $C^5$, secured to the needle-bar $C^6$. Through these connecting devices the needle-bar is caused to reciprocate vertically when shaft B is rotated. The needle-bar carries the usual eye-pointed perforating-needle $C^7$, which carries its thread through the material near the edge of the button-hole slit. Below the bed upon shaft $C^2$ an arm $C^8$ is secured, which has attached to it a needle-holder $C^9$, as clearly shown in Fig. 2. This holder carries a curved non-perforating needle $C^{10}$, which carries a thread, as shown in Figs. 21 to 25. The non-perforating needle passes up through the usual central opening in the bed of the machine, as shown in Figs. 2 and 7, and carries its thread through the button-hole slit and to a height sufficiently above the same to permit the looper to take its thread, as will be described. The axis of shaft $C^2$ lies in a plane oblique both to a vertical and horizontal plane through the axis of rotary shaft B, and consequently the path of the non-perforating needle $C^{10}$ is oblique to the path of the perforating neele $C^7$, and thereby carries its thread readily through the loop presented by needle $C^7$, as illustrated in Figs. 21 and 22. When the upper needle $C^7$ has descended through the material to its lowest point and started back, it has slackened its thread and thrown out a loop. In this position it rests for an instant, while needle $C^{10}$ enters the loop and carries its thread up through the same and through and above the button-hole slit, crossing the path of needle $C^7$ after passing up through said slit.

In the illustrative diagrams Figs. 21 to 25, inclusive, the several stages of the stitch-formation, or interlacing of the upper and under threads, are shown, $C^{11}$ representing the edge of a button-hole upon which the overseaming is being performed. When the under thread has, by the means and in the manner described, been carried up through a loop of the upper thread and through and above the button-hole slit, another device comes into play. Surrounding the needle-bar $C^6$ is a sleeve $C^{12}$, which is supported in the head of the machine, so as to turn freely about the needle-bar. The lower end of the sleeve carries a looper $C^{13}$, which moves eccentrically about the upper needle, the latter being secured in the needle-bar at one side of its center as shown. To the upper end of the looper sleeve is attached an arm $C^{14}$, (see Fig. 10,) to which is pivoted a link $C^{15}$, which at one end is connected by a ball-and-socket joint to the side of a slotted swinging arm $C^{16}$, which is pivoted at its upper end to the back side of the head of the machine, as shown in Fig. 8. The screw-stud which secures the needle-bar link $C^4$ to the disk $C^3$ passes through the slot in swinging arm or bar $C^{16}$ and serves as the means for actuating said bar when the disk is revolved and through the connections described imparts timely movements to the looper $C^{13}$. Each time that the swinging arm $C^{16}$ is caused to move across the face of the disk $C^3$ by the turning of the latter the looper $C^{13}$ is semi-rotated about needle $C^7$, and this occurs during about a quarter-turn of the disk from the position shown in Fig. 10, and while the needle is up, or nearly so, to its highest position, and again when the needle is down to its lowest position, when the looper retraces its first semi-rotative movement. The intermediate quarter-turns of the disk do not practically move the looper-sleeve by reason of the peculiar jointed connections which accommodate themselves readily to such movements of the disk without turning the sleeve. When the upper and under needles and looper are in the respective positions shown in Fig. 22, the upper needle having descended through the goods and left the loop of its thread around the under needle, and the latter needle having ascended through the button-hole slit and is holding its thread above the work, then the actuating devices of the upper needle and looper are in the positions shown in Figs. 9 and 10. During the next quarter-turn of the disk the upper needle will remain at rest while the swing of arm $C^{16}$, caused by such quarter-turn of the disk, will cause a rapid semi-rotation of the looper, which in its movement will seize the thread of the under needle and carry a loop thereof over the edge of the button-hole and spread it in the path of the upper needle, so that at the next descent of the latter needle it will pass with its thread through the same, as illustrated in Figs. 23, 24, and 25, and when the upper needle is at its lowest point again, and while resting there for the under needle to enter its loop, as shown in Fig. 21, a quarter-turn of the disk when its driving-stud is diametrically opposite the position shown in Figs. 9 and 10 returns the looper to its former position, as shown in Fig. 21. Thus the interlacing of the threads through and over the edge of the button-hole is accomplished.

It is very essential to the success of the looping operations just described that the perforating-needle be placed at one side of the center of the needle-bar, so that the looper which moves about the axis of the needle-bar shall move eccentrically to the needle, otherwise it would have to move farther to carry its loop into and spread it across the path of the needle, so that the needle would pass through it, and consequently would fail to do so in time—that is, before the needle had descended through the goods being stitched. To properly space the stitches thus formed around the button-hole to give to it a suitable form and edge finish is the function of the feeding devices, which I will now describe, first calling attention to the form of the button-hole illustrated in Fig. 26 and to the fact that three different speeds are required in the movement of the cloth-clamp to accomplish the proper spacing of the stitches—namely, the fastest speed on the curves $l$, the slowest speed on the straight parts $m$, and a quicker speed around the eye $n$. The devices employed for feeding the material while being stitched are the clamp D (shown in perspective in Fig. 1,) the slotted work-plate D', upon which the clamp travels and which is shown in Fig. 15, the grooved ratchet-wheel $D^2$, which underlies the work-plate and is shown in Figs. 16 and 17, and a pawl mechanism $D^3$, comprising several parts, by which the feed-wheel $D^2$ is intermittently rotated.

A feeding mechanism comprising a clamp, a slotted work-plate, and an underlying grooved wheel is not new; and the novelty of my present invention in respect to these parts consists in certain details of construction and modes of operation which I will point out and describe.

The stitching of the peculiar form of button-hole which my machine makes commences at the point $l$. The first movement of the clamp D from the position in which it is shown is directly forward, so as to carry its pin $D^4$ into the center of the part $a'$ or the slot $D^5$ of the plate and into a corresponding position in the groove $D^6$ of the underlying feed-wheel. When the pin of the clamp is thus located through the action of the cutting devices, as before explained, then the movement of wheel $D^2$ commences, and its slide $D^7$ is moved into contact with the pin, thereby turning the clamp upon a line of curvature corresponding to the curve of the groove $D^5$ in the part marked $a$ while the edge of the base of the clamp bears against the spring-roll $D^8$, projecting above the work-plate, as shown in Fig. 1, and this movement continuing during a quarter-turn of the feed-wheel produces the curved line of stitches $l$ on the button-hole. The clamp-pin then reaches the part $b$ of the slot $D^5$ in the work-plate, Fig. 15. At this point slide $D^7$ of the feed-wheel, Fig. 16, which has carried the clamp to this position, retreats into the recess $D^9$, specially adapted to receive it only in the hub of the machine-bed, around which the feed-wheel revolves far enough to allow its outer end to pass freely by the clamp-pin. Then, as the wheel continues to revolve, its heart-shaped groove, operating in conjunction with the part $b$ of the slot in the work-plate, acts upon the clamp-pin during a half-revolution of the feed-wheel, and thereby moves the clamp lineally into the part $c$ of the slot in the work-plate, thus producing the line of switches $m$ on one of the straight sides of the button-hole. Now the slide $D^{10}$ of the feed-wheel engages the clamp-pin and carries it a half-revolution of the wheel and through the circular part $c$ of the slot in the work-plate when the pin reaches part $d$ of said slot, and slide $D^{10}$ retreats into its special recess $D^{11}$ in the hub and passes the pin. Again, the groove in the wheel and the straight part $d$ in the slot in the plate combine during a half-revolution of the wheel to force the clamp backward lineally in the direction indicated by the arrow, and thus complete the spacing of the stitches on the remaining straight side of the button-hole. Next the slide $D^{12}$ engages the clamp-pin and carries it forward during a quarter-revolution of the wheel through part $a$ of the work-plate slot, and forces it into the position indicated in Fig. 16, thus completing the curved stitching opposite $l$ and finishing the button-hole. Slide $D^{12}$, when the wheel is again turned, retreats into the special recess $D^{13}$ in the hub, and thus passes the pin. This completes the description of the movements of the clamp in spacing the stitches around the button-hole, it having made but one revolution around its central button $d$, on the work-plate, while its actuating feed-wheel has made two revolutions.

Upon the under side of the feed-wheel are grooves and pivoted switches, as indicated in broken lines in Fig. 17, which serve to vary the intermittent rotary movement of the wheel, causing it to move faster or slower, according to the requirements of the stitching on different parts of the button-hole edge, as before referred to.

Referring to Fig. 7, it will be seen that a rock-shaft E is employed, upon the rear end of which is secured a slotted arm E'. To this arm is adjustably connected an eccentric arm $E^2$, which at its upper end is mounted upon and actuated by shaft B, as shown in Fig. 8, and this imparts a rocking motion to shaft E. Near the opposite end of the latter shaft is secured thereon another arm $E^3$, which is connected by a swivel-joint to an arm $E^4$. A slotted arm $E^5$ is fitted to turn about the hub $E^6$, and to arm $E^5$ arm $E^4$ is attached by pin $E^7$, which projects through the slotted arm and into the groove in the feed-wheel, and is free to move in said slot as the groove may carry it. To the outer end of arm $E^5$ is attached the pawl-carrier $E^8$, whose pawls engage the teeth on the periphery of the feed-wheel. When shaft B is revolved, shaft E is rocked by arm $E^2$, and such rocking movement is communicated through arms $E^3$ and $E^4$ to arm $E^5$, which, through its pawl-carrier and pawls $E^8$, imparts motion to the feed-wheel, and this movement of the feed-wheel is varied in extent according to the position of the stud $E^7$ in the slot of arm $E^5$, the movement being greater when the stud is nearer to and less when the stud is farther from the hub $E^6$, about which said arm rocks, said variable positions of the stud $E^7$ in slot $E^5$ being governed by the form of the grooves which the stud travels in on the under side of the feed-wheel as the latter turns around. When a button-hole is in position and ready to commence stitching the same, as before described, the inner and upper end of stud $E^7$ will stand in the under groove of the feed-wheel, as indicated by dotted lines $E^9$ in Fig. 17. As the wheel is caused to move around step by step by the means just described and in the direction of the arrow, the first quarter-turn of the wheel will be rapid, the power being applied near the fulcrum of the pawl-arm or lever $E^5$, and consequently causing the pawls to sweep over more teeth and to carry the wheel farther around when they move forward; but when the wheel has progressed so far as to carry the switch $E^{10}$ past the stud $E^7$ and to bring the part $f$ of the groove around to the stud, being one quarter-turn of the wheel, then stud $E^7$ will be carried by the groove farther out from the central hub on which the pawl-arm $E^5$ turns, and consequently during the next half-revolution of the wheel it will progress slower as the pawls are given less sweep over the teeth and move the wheel to less extent. At the end of this half-revolution of the wheel part $g$ of the groove will have come around to the stud and the button-hole will have been stitched from the starting-point along one side of the eyelet end of the hole. Now the part $g$ of the groove carries the stud $E^7$ a little nearer to the hub, and consequently quickens the movement of the wheel by giving it a longer throw at each vibration of the rock-shaft. This speed is kept up during a half-revolution of the wheel, which carries switch $E^{11}$ past the stud $E^7$, and thereby closes the groove at $g$ and opens switch $E^{10}$ by contact of the switches with the stud in passing, bringing part $f$ around to the stud, this half-revolution completing the feeding for the stitching around the eyelet part of the button-hole. Next the speed is slowed down again, while the groove between $f$ and $g$ is turned past the stud, completing the last straight side of the button-hole and a half-revolution of the wheel, and then, the switch $E^{11}$ having closed the outer groove at $g$, the line from $g$ to $E^9$ will travel past the stud at a more rapid speed during the next quarter-turn of the wheel, thus completing the second full revolution of the wheel and the spacing of the stitches around the button-hole. The arm of the usual spreader-lever $D^{14}$ of the clamp is extended and formed and arranged to come in contact with a pin $D^{15}$, set up in the work-plate, as shown in Fig. 2, so that when the clamp moves around the lever $D^{14}$ will wipe against and past the pin $D^{15}$, and thus automatically produce the requisite lateral expansion of the jaws of the clamp, whose arms bear against said cam in the usual manner, thus saving time and relieving the operator of that duty.

The usual thread-guides, take-up, tension devices, &c., are of course employed in this machine; but being old and well-known it is not deemed necessary to describe such common devices in detail. A slot $c'$ is made through the plate and through a portion of the central button $d'$, which is secured to the central part of the work-plate and serves the usual purpose of guiding the clamp in relation to the needles, the two parts of the plates being of course secured to the bed. This slot $c'$ is made to allow the cutter to come up through the plate within the space inclosed by the hub, around which the feed-wheel turns and meet the overhanging cutter-block. Slot $a'$ at the same time aids in guiding and properly locating the outer end of the clamp in relation to the central button and the cutter and block.

The slot or opening $D^5$ in the work-plate from $b$ to $a'$ and from $d$ to $a'$ is not a true circle, but to a small degree gradually approaches the central button $d'$ from $a'$ in both directions; but part $c$ of said slot from $b$ to $d$ is a true circle around the central button $d'$. In the upper face of the underlying wheel the groove which actuates the clamp through its pin $D^4$ and in conjunction with slot $D^5$ of the work-plate is heart-shaped or eccentric; but its point of greatest distance from the center or axis of the wheel is reduced to the arc of a true circle between slides $D^{12}$ and $D^7$, and I have found this modification of the groove quite an essential feature in my present invention, it being necessary to make some allowance in the movement of the wheel for the clamp to get into its true position before the wheel acts upon it, and also to allow a stitch or two to be taken at the commencement and conclusion of the stitching without moving the clamp to bar and finish the button-hole at the point $l$; and the two slides $D^{12}$ and $D^7$ are spaced in the wheel and groove with special reference to this purpose, and with the same end in view the portion of the groove embraced between them is made the arc of a true circle, so as to be inoperative on the clamp-pin, while slide $D^7$ is moving into position to engage the same.

The machine is hung upon the usual stands S and S', so as to be readily turned over to get at the under side of the same, as shown in Fig. 7; but in this construction and arrangement the driving-shaft bearing $A^{12}$ is extended and formed to serve as the journal in stud S', on which the machine is turned, thus turning the machine about the axis of the driving-shaft, and thereby avoiding the necessity hitherto existing in this class of machines of throwing off the driving-belt whenever the machine was thus turned over.

I claim—

1. A button-hole-stitching machine embodying the following combination of mechanisms, namely: a feed mechanism comprising a traveling clamp D, which presents the button-hole edge to the stitching devices in the manner described, a stop mechanism by which the feeding and stitching operations are automatically suspended while the button-hole is being cut in the material held in the clamp and after the cutting is accomplished are again set in motion, mechanism by which the clamp is automatically withdrawn from the actuating-wheel to the proper position relatively to the cutting devices to have the button-hole cut in the material held therein and after such cutting is replaced upon its actuating-wheel, mechanism by which the button-hole is automatically cut in the material held in the clamp while the latter is so withdrawn, and an overedge-stitching mechanism by which the button-hole is finished in the manner described, all co-operating to automatically cut and stitch a button-hole, substantially as specified.

2. A button-hole-stitching machine embodying the following combination of mechanisms, namely: an overedge-stitching mechanism, a feeding mechanism comprising a traveling clamp D, a locking mechanism operated by the clamp D to stop the stitching and feeding operations while the cutting mechanism is in operation, and a cutting mechanism which automatically cuts the button-hole in the material held in the clamp and acts upon the locking devices to release the stitching and feeding mechanism therefrom after the button-hole is cut, all substantially as specified.

3. The combination of the driving-shaft $A^{11}$, supported in a swivel-bearing, worm $A^{10}$, formed thereon, worm-gear $A^4$, mounted on a stud $A^5$, eccentric arm $A^{27}$, actuated by the worm-gear, block $A^{19}$, centered at one end in and supporting the end of shaft $A^{11}$ and arranged to rock on stud $A^{14}$, spring $A^{21}$, arranged to bear forcibly against the opposite end of the block when the worm and gear are engaged, lever $A^{13}$, turning on stud $A^{14}$ and carrying a pawl $A^{16}$, which engages a pin $A^{18}$ in the block, pawl $A^{24}$, pivoted to the bed of the machine and also engaging pin $A^{18}$, and the cutting devices comprising levers $A^2$ and $A^7$, all coacting so that the movement of lever $A^{13}$, as described, causes the cutting devices to be actuated during one revolution of gear $A^4$ and to be automatically stopped, as specified.

4. In combination with mechanism for cutting and stitching button-holes, a driving-shaft mounted in a swivel-bearing, a worm thereon, an actuating worm-gear, and means whereby the worm and gear are engaged and disengaged while the shaft is rotating, as and for the purposes specified.

5. In combination with the bed and stitch-forming mechanism of a button-hole-stitching machine, a cutting mechanism comprising a lever $A^2$, pivoted above the machine-bed, a lever $A^7$, pivoted below the bed, one lever carrying a cutter and the other moving a cutter-block and being arranged to bring the cutter and block into contact with each other through openings in the bed, work-plate, and clamp, a lever $A^{26}$, pivoted below the bed and arranged to be actuated by lever $A^7$ and to impart movement to clamp D, and clamp D, arranged to be moved lineally on the work-plate, whereby the clamp is automatically drawn back and displaced relatively to its actuating devices, the button-hole cut in the material held therein, and the clamp replaced on the work-plate ready for the stitching operations to commence, as specified.

6. The automatic button-hole-spreading device consisting of the long-armed spreader-cam $D^{14}$, which forms part of the clamp, and a pin $D^{15}$, fixed in the work-plate or bed and arranged to project upward into the path of arm $D^{14}$, so that as the clamp is fed around upon the work-plate the arm will come into contact with the pin and thereby cause cam $D^{14}$ to turn between the arms of the clamp-jaws, which bear against it, and thus spread the jaws and open the button-hole held therein.

7. The combination of clamp D, provided with an overhanging arm $D^{16}$, the work-plate having the slot $b'$ therein, the clamp-moving lever $A^{26}$, slotted and upturned through slot $b'$ in the work-plate to receive said arm, mechanism, substantially as described, for respectively actuating said clamp and lever, and the pivoted latch $D^{17}$, arranged to be actuated by the clamp-base to close the outward passage from the slot in lever $A^{26}$ in advance of the arrival of the clamp-arm therein, as and for the purposes specified.

8. In combination with the stitch-forming and cutting devices, the traveling clamp D, provided with an overhanging arm D¹⁶, arranged to engage lever A²⁶, the lever A²⁶, and lever a⁷, whereby the clamp is automatically drawn back to cut the button-hole in the material held therein and moved forward again to stitch the same, as specified 9. The combination, with the stitch-forming and feeding devices of a button-hole sewing-machine, of the stop-motion devices comprising the combination of clamp D, having the described movements imparted to it, the slide B¹⁵, lever B¹³, lever B¹², rock-shaft B⁵, arms B⁶ and B⁸, clutch B⁴, and spring B⁷, whereby the movements of the feeding and stitching devices are automatically stopped upon the completion of the stitching of a button-hole, as specified.

10. The combination, with the cutting, stitch-forming, and feeding devices, of lever A², actuated substantially as described, and provided with an arm B¹¹, lever B¹², arranged to be depressed by said arm, rock-shaft B⁵, turned by lever B¹², arms B⁶ and B⁸, attached to the rock-shaft, and pulleys B' and B², arranged to co-operate as described, whereby the stitching and feeding devices are automatically set in motion upon the completion of the cutting of the button-hole in the material held in the clamp and the proper location of the same on the work-plate, as specified.

11. In a button-hole-stitching machine, the combination of mechanism for cutting the button-hole, mechanism comprising a traveling clamp D for feeding the button-hole, mechanism for stitching the button-hole, and intermediate locking and unlocking devices, whereby both the feeding and stitching mechanisms are held idle while the button-hole is being cut and are automatically released by the action of the cutting devices and set in motion after the button-hole is cut, all substantially as specified.

12. The combination, with stitch-forming mechanism, of the clamp D, the slotted work-plate D', the underlying feed-wheel D², and suitable mechanism for rotating the same, as described, the wheel being grooved and provided with slides D¹⁰ D⁷ D¹² and adapted to turn about a hub provided with recesses D⁹ D¹¹ D¹³ and to impart, in conjunction with the slotted work-plate, the described movements to the clamp, as specified.

13. In combination with stitch-forming mechanism, the feed-wheel D², having an eccentric groove cut therein, and slides D¹² and D⁷, arranged to project into said groove, and having that portion of the groove which is between said slides formed on the arc of a true circle whose center is the axis of rotation of the wheel, substantially as and for the purposes specified.

14. In combination with the stitch-forming and cutting devices, clamp D, provided with a pin D⁴, the work-plate D', slotted, as described, and the underlying feed-wheel D², provided with a groove and slides, as specified, and having its groove D⁶ opened or widened between its slides D⁷ and D¹², thereby permitting the clamp-pin to be drawn into slot a' of the work-plate by the cutting mechanism, as and for the purpose specified.

15. The variable-feed mechanism comprising the combination of the grooved feed-wheel D², provided with switches E¹⁰ and E¹¹, by which the connected grooves in that side of the wheel are automatically opened and closed, the slotted lever E⁵, arranged to turn about the hub, which also serves as the axis of the wheel, and carrying pawls that engage the peripheral teeth on the wheel, lever E⁴, stud E⁷, fixed in and extending from lever E⁴ through the slot in lever E⁵ into the groove in the feed-wheel, and by contact with switches E¹⁰ and E¹¹ as they pass by causes them to open and close said groove, swivel-lever E³, secured at one end to the rock-shaft E and at the other to lever E⁴, and mechanism for rocking said shaft, whereby the feed-wheel is moved at different rates of speed, according to the required spacing of the stitches on different portions of the button-hole, as specified.

16. In combination with suitable actuating mechanism therefor, the feed-wheel D², provided with grooves and switches for opening and closing the grooves, and devices connecting said grooves with the actuating mechanism, whereby said mechanism in its operation upon the wheel will be controlled and varied, substantially as described.

17. In combination with the traveling clamp D of a button-hole-stitching machine, a grooved feed-wheel provided with peripheral teeth, a pawl-carrying lever E⁵, whose pawls engage said teeth, and an actuating-lever E⁴, arranged to slide on the pawl-lever and carrying a stud E⁷, projecting into the groove of the feed-wheel, whereby said groove automatically governs the backward throw of the pawls in renewing their hold upon the teeth and accordingly varies and regulates the forward movement of the wheel, as specified.

18. In combination, an overedge-stitching mechanism, a traveling clamp D and means for actuating the same, a button d', around which the clamp rotates, and a guiding-slot D⁵, extending around button d' and through which the clamp is actuated, the slot being composed of an elliptical part a, a lineal part b, an arc of a circle c, and a lineal part d, whereby the clamp is so guided that it presents the work held therein to the stitching devices, to be finished thereby in the manner and form specified.

19. The combination, in a button-hole sewing-machine, of a stitch-forming mechanism, a traveling clamp D, mechanism for actuating the clamp, and a work-plate secured to the bed in two parts, arranged one within the other, with an opening or groove D⁵ between, composed of an elliptical part a, a lineal part b, an arc of a circle c, and a lineal part d, through which the clamp is operated and guided, as and for the purposes specified.

20. In a button-hole sewing-machine, the combination of a stitch-forming mechanism, a cutting mechanism, a traveling clamp D, with means for actuating the same, and a work-plate in two parts secured to the bed, the inner plate being provided with a button $d'$, and having a slot $c'$ cut through the inner plate and button, a slot $a'$ cut through the edge of the curve of the outer plate, and a slot $b'$ cut through the outer plate, all said slots being in a line radial to the central button $d'$, as and for the purposes specified.

21. In combination, the non-perforating needle $C^{10}$, arranged below the machine-bed, and means for actuating the same, needle-bar $C^6$, arranged above the machine-bed, and means for actuating the same, the perforating-needle $C^7$, eccentrically inserted in bar $C^6$, sleeve $C^{12}$, arranged to have a rotative reciprocating movement about the axis of said bar, and looper $C^{13}$, secured to and moved by and with said sleeve, whereby the upper thread is passed down through and the under thread is carried upward and interlaced therewith over the edge of the button-hole, as specified.

22. In combination, the rotary disk $C^3$ and means for revolving the same, needle-bar $C^6$, connected by a link $C^4$ with said disk, a slotted swinging arm $C^{16}$, hung on a fixed pivot and moved by the stud connecting link $C^4$ with the disk, link $C^{15}$, jointed to arm $C^{16}$, and arm $C^{14}$, secured to sleeve $C^{12}$ and pivotally connected with link $C^{15}$, whereby timely movements are imparted to looper $C^{13}$, as and for the purposes specified.

23. The needle mechanism consisting of the rotary shaft B above the work-plate, the vertically-reciprocating needle-bar $C^6$, carrying a perforating-needle and actuated by said shaft, the looper $C^{13}$, moving about the axis of said needle-bar, the rock-shaft $C^2$ below the bed, and connecting devices between said shafts, whereby shaft $C^2$ is rocked, and arm $C^8$, secured to the rock-shaft and carrying a non-perforating needle, the shaft $C^2$ being oblique to both a vertical and horizontal plane through the axis of shaft B, by which arrangement a peculiar movement is given to the lower needle relatively to the movement of the upper needle, as and for the purposes specified.

24. The combination of the supporting-stands S and S', upon which the machine is mounted so as to turn back, as described, and the extended swivel-bearing $A^{12}$, adapted and arranged to serve as the journal of the machine in stand S', whereby the machine is turned about the axis of the driving-shaft $A^{10}$ without removing the driving-belt, as specified.

JOHN W. LUFKIN.

Witnesses:
EUGENE HUMPHREY,
CLARA L. POWER.